United States Patent
Takaiwa et al.

(10) Patent No.: US 7,554,779 B2
(45) Date of Patent: Jun. 30, 2009

(54) DISTRIBUTED POWER SUPPLY CIRCUIT

(75) Inventors: Kazumaro Takaiwa, Kawasaki (JP); Yuichi Kotaki, Kawasaki (JP); Kazuaki Kobayashi, Kawasaki (JP); Takashi Nakajima, Kawasaki (JP); Masahiro Agata, Kawasaki (JP); Yoshihisa Funami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 189 days.

(21) Appl. No.: 11/878,779

(22) Filed: Jul. 26, 2007

(65) Prior Publication Data
US 2008/0062587 A1 Mar. 13, 2008

(30) Foreign Application Priority Data
Sep. 13, 2006 (JP) ............................. 2006-248640

(51) Int. Cl.
*H02H 9/08* (2006.01)
(52) U.S. Cl. ........................................ 361/19; 361/93.9
(58) Field of Classification Search .................... 361/18, 361/93.7–93.9; 323/284, 908
See application file for complete search history.

(56) References Cited
U.S. PATENT DOCUMENTS
7,266,000 B2 * 9/2007 Terdan ......................... 363/48
7,324,316 B2 * 1/2008 Chen et al. ................... 361/93.9

FOREIGN PATENT DOCUMENTS
JP 09-062408 3/1997
JP 2005-276034 10/2005

* cited by examiner

*Primary Examiner*—Danny Nguyen
(74) *Attorney, Agent, or Firm*—Staas & Halsey LLP

(57) ABSTRACT

A distributed power supply circuit supplying common power to multiple packages in an apparatus so that a primary voltage of the common power is converted into a secondary voltage in a voltage conversion part so as to be supplied to a circuit in each of the packages is disclosed. The distributed power supply circuit includes a power supply monitoring part configured to monitor the primary voltage; a reset part configured to stop the supply of the primary voltage to the voltage conversion part when the power supply monitoring part detects the abnormality of the primary voltage; and a discharge part configured to release a stored charge on the primary side of the voltage conversion part when the power supply monitoring part detects the abnormality of the primary voltage. The power supply monitoring part is separated from the reset part by multiple diodes so as to be provided in parallel with the reset part.

7 Claims, 15 Drawing Sheets

DISTRIBUTED POWER SUPPLY CIRCUIT

BACKGROUND OF THE INVENTION

1. Field of the Invention

The present invention relates generally to distributed power supply circuits, and more particularly to a distributed power supply circuit that supplies common power to multiple packages in an apparatus so that the primary voltage of the common power is converted into a secondary voltage by a voltage converter and supplied to circuits in each package.

2. Description of the Related Art

For example, a transmitter contains multiple packages in a shelf. The shelf supplies common power of, for example, −48 V to each package, and the supplied power is converted into power of, for example, 3.3 V in the power supply circuit of the package and the power of 3.3 V is supplied to each circuit part inside the package. That is, since the packages have their respective power supply circuits, this is referred to as distributed power supply.

Conventionally, the distributed power supply circuit is provided with a monitoring circuit that monitors a primary voltage status. Further, in the case of configuring an apparatus, the distributed power supply circuit is provided with a surge protection circuit, an inrush current prevention circuit, an EMI noise filter, and an input parasitic inductance oscillation prevention circuit on the primary side, and with an insulating OBP (Onboard Power Supply) for conversion into a secondary voltage, an OBP output noise filter, a secondary residual charge discharge circuit, and various loads in accordance with the form of use of a user.

FIGS. 1 and 2 are a block diagram and a circuit diagram, respectively, of a conventional distributed power supply circuit. Referring to FIGS. 1 and 2, diodes and a fuse are provided at a power supply terminal 10 on the negative side (−48 V). A surge protection circuit 11 performs protection against surges using, for example, a varistor that conducts in response to a surge such as lightning or kickback. A power supply monitoring and inrush current prevention circuit 12 prevents an inrush current at the time of turn-on, and monitors the status of a primary voltage. An EMI noise filter 13 removes electromagnetic wave noise. An input parasitic inductance oscillation prevention circuit 14 prevents oscillation due to input parasitic inductance.

Each of insulating OBPs 15 converts a primary power supply of −48 V into a secondary power supply of 3.3 V using, for example, a switching regulator. Each of OBP output noise filters 16 removes noise generated in the corresponding insulating OBP 15. Each of secondary residual charge discharge circuits 17 releases a residual charge on the secondary side.

Japanese Laid-Open Patent Application No. 2005-276034 discloses providing a primary power supply monitoring part and discharging a residual charge by providing a switch for connecting to a resistor for discharging the residual charge on the secondary side of an OBP. Further, Japanese Laid-Open Patent Application No. 9-62408 discloses connecting a diode to the ground-side power supply input of a DC-DC converter and separating an input power supply by the diode.

In the distributed power supply, however, the primary power supply (−48 V) enters a package.

In this case, there is a problem in that a response time necessary for monitoring the primary voltage differs between individual packages, and there is a problem in that at the time of re-inserting a removed package, the packages already installed in the shelf wrongly detect a primary power supply transient.

FIG. 3 is a diagram showing an equivalent circuit at the time of occurrence of abnormality in the power supply. In FIG. 3, the discharge route at the time of occurrence of an output variation such as a voltage drop (a voltage increase from −48 V) in the primary power supply is indicated by arrow. When an instantaneous break occurs in the primary power supply, discharging of an internal capacitor Cin is started. Since there is a reverse connection prevention diode D, the discharge route is closed inside the package so as to pass through an internal resistor Ro of the insulating OBP 15. The internal resistor Ro of the insulating OBP 15 has quite a large value, so that it takes time to discharge the internal capacitor Cin.

The response time, which is a time required for the power supply monitoring and inrush current prevention circuit 12 to determine that the primary voltage is below a predetermined value is determined by the relationship between (a) the total capacitance of capacitors C1 through C7 of the EMI noise filter 13 and the input parasitic inductance oscillation prevention circuit 14 and the total capacitance of secondary-side capacitors on the secondary side (right side) of the insulating OBP 15 and (b) current consumption on the secondary side.

The relationship between the total capacitance of the primary-side and secondary-side capacitors and current consumption on the secondary side differs between multiple packages in a shelf of a transmitter. Therefore, in one package, the response time at the time of a power supply instantaneous break is short so that the package immediately operates, while in another package, the response time is long so that the package is slow to respond. Thus, there is a problem in that the response time required for monitoring the primary voltage differs between individual packages.

Further, at the time of turning off the primary power supply or removing a package, electric charges remain in the capacitors C1 through C7 of the EMI noise filter 13 and the input parasitic inductance oscillation prevention circuit 14. A discharge from these capacitors C1 through C7 causes noise at the time of turning on the primary power supply or inserting a package so as to give impetus to causing variations in the primary supply voltages of other packages in the same shelf. In the worst case, the other packages in the same shelf sharing the primary power supply detect the noise and have a power supply reset, so that a system that should continue operating is temporarily initialized. This causes a problem in that an instantaneous break occurs in an operating line in the transmitter, for example.

In the disclosure of Japanese Laid-Open Patent Applications No. 2005-276034 and 9-62408 described above, the response time at the time of a power supply instantaneous break in power supply monitoring also differs between packages, so that there is the same problem in that electric charges remain in internal capacitors at the time of turning off a primary power supply or removing a package so that noise is generated by a discharge from the capacitors at the time of turning on the primary power supply or inserting a package.

SUMMARY OF THE INVENTION

Embodiments of the present invention may solve or reduce one or more of the above-described problems.

According to one embodiment of the present invention, there is provided a distributed power supply circuit in which one or more of the above-described problems are solved.

According to one embodiment of the present invention, there is provided a distributed power supply circuit capable of controlling a response time for detecting a primary power supply transient to a desired value and preventing generation of noise at the time of package attachment.

According to one embodiment of the present invention, there is provided a distributed power supply circuit supplying common power to multiple packages in an apparatus so that a primary voltage of the common power is converted into a secondary voltage in a voltage conversion part so as to be supplied to a circuit in each of the packages, the distributed power supply circuit including a power supply monitoring part configured to monitor the primary voltage; a reset part configured to stop the supply of the primary voltage to the voltage conversion part when the power supply monitoring part detects an abnormality of the primary voltage; and a discharge part configured to release a stored charge on a primary side of the voltage conversion part when the power supply monitoring part detects the abnormality of the primary voltage, wherein the power supply monitoring part is separated from the reset part by multiple diodes so as to be provided in parallel with the reset part.

According to the above-described distributed power supply circuit, it is possible to control a response time for detecting a variation in the primary voltage to a desired value, and it is possible to prevent noise generation at the time of package attachment.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

First Embodiment

Figure 1:
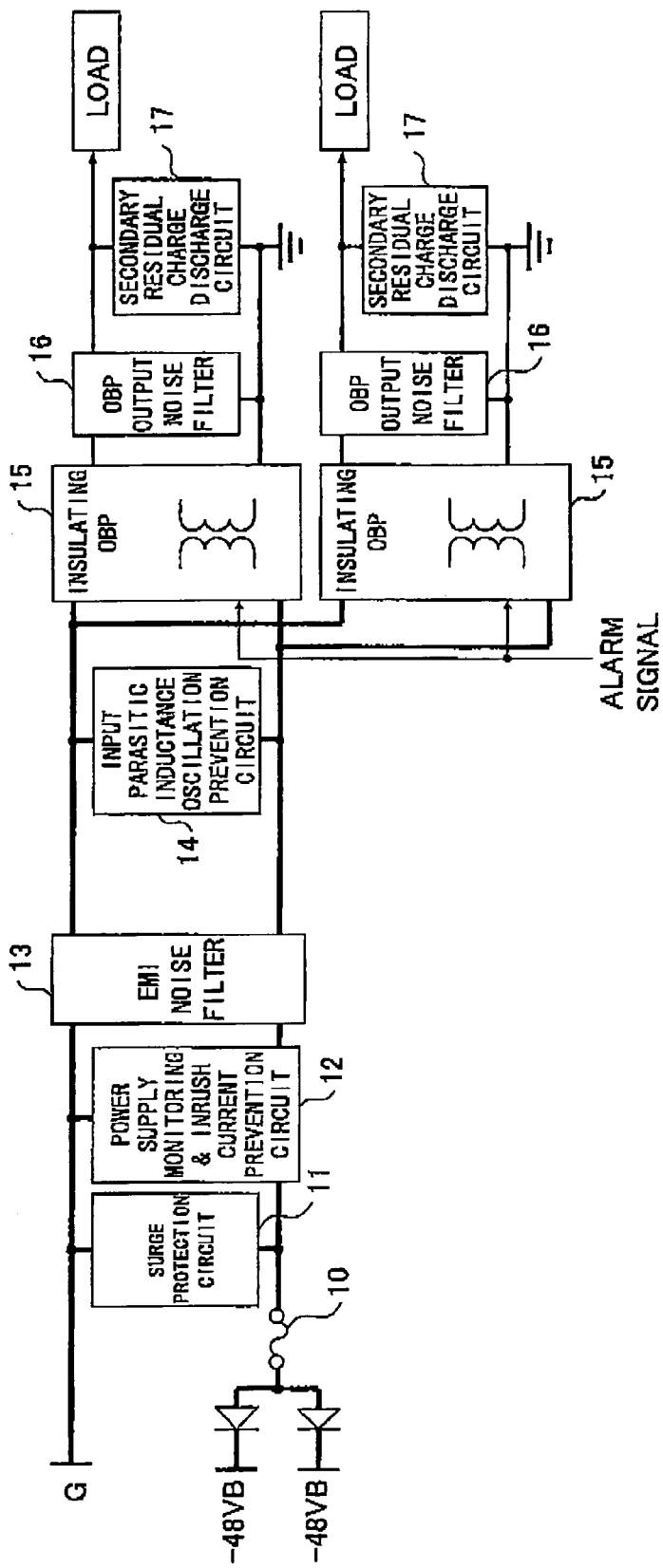
FIG. 1 is a block diagram showing a conventional distributed power supply circuit.
Figure 2:
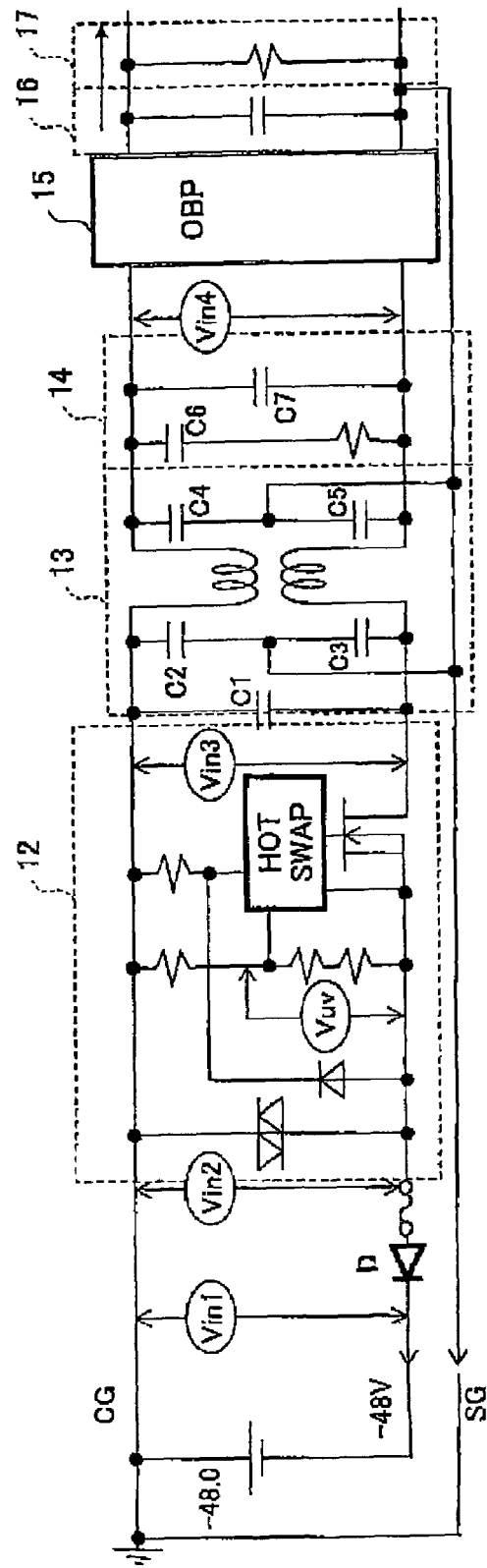
FIG. 2 is a circuit diagram showing the conventional distributed power supply circuit.
Figure 3:
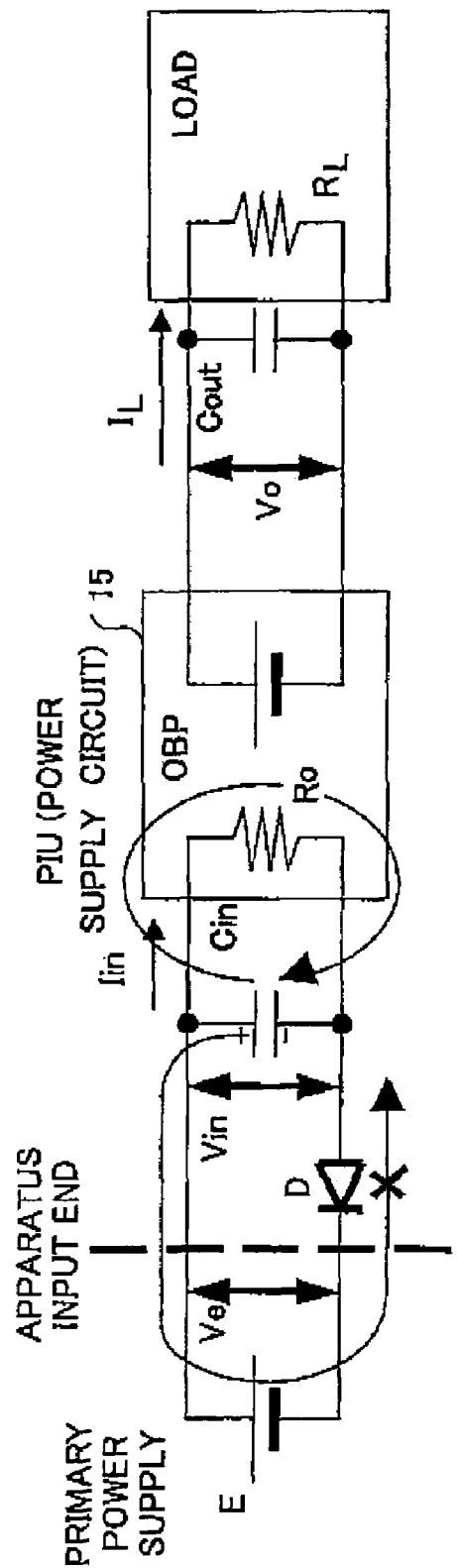
FIG. 3 is a diagram showing an equivalent circuit of the conventional power supply at the time of occurrence of abnormality in power supply.
Figure 4:
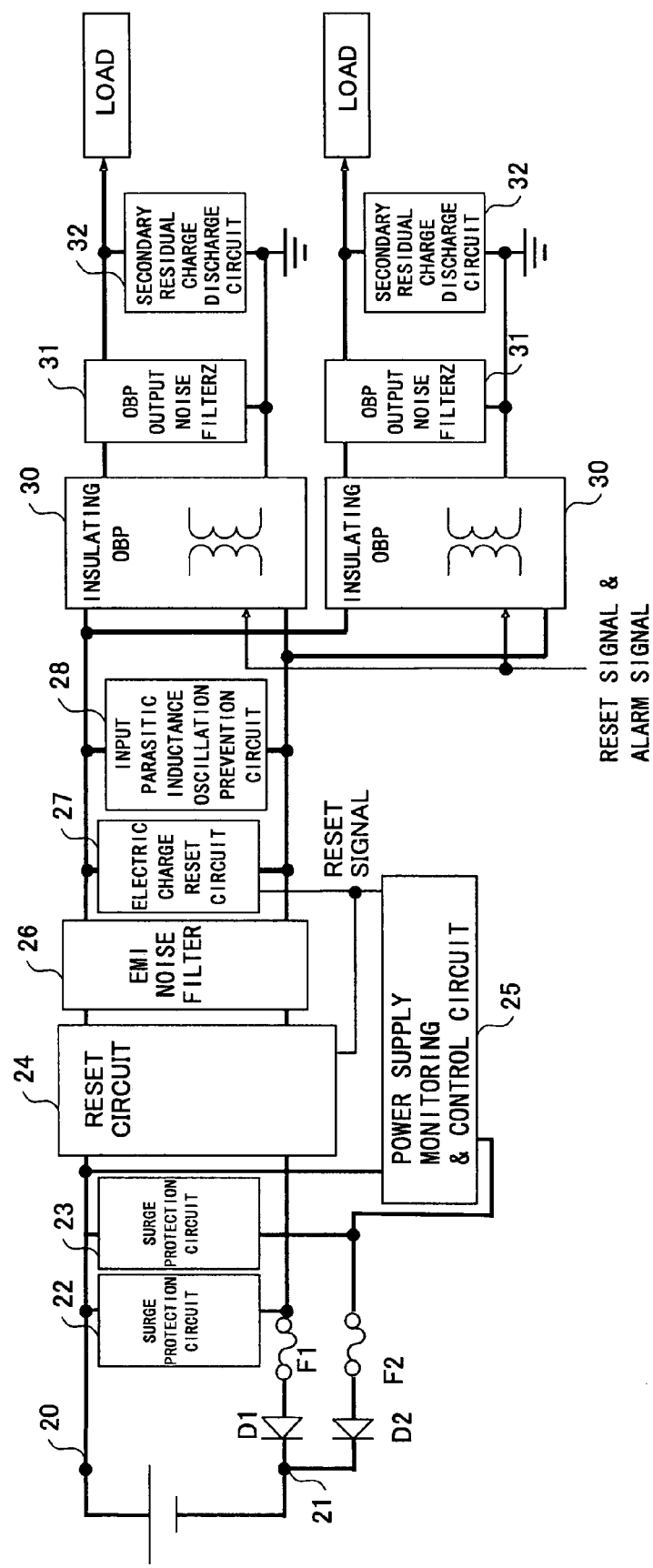
FIG. 4 is a block diagram showing a distributed power supply circuit according to a first embodiment of the present invention.
Figure 5:
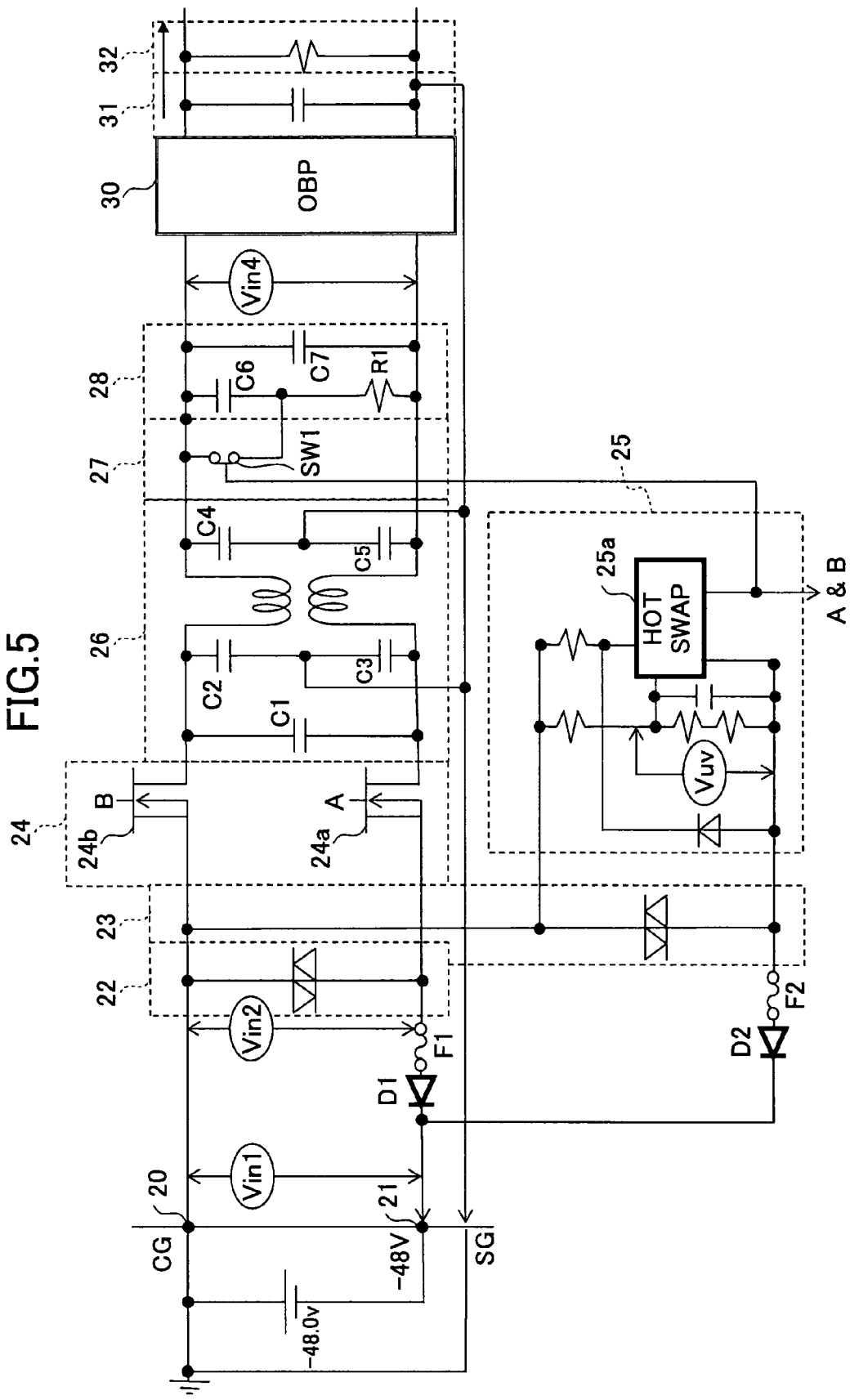
FIG. 5 is a circuit diagram showing the distributed power supply circuit according to the first embodiment of the present invention.

FIGS. 4 and 5 are a block diagram and a circuit diagram, respectively, of a distributed power supply circuit according to a first embodiment of the present invention. According to this distributed power supply circuit, a power supply monitoring and control circuit 25 and a reset circuit 24 are separated by diodes D1 and D2 for reverse connection prevention so as to be connected in parallel as opposed to the conventional circuit where a power supply monitoring circuit and an inrush current prevention circuit are integrated. Further, the distributed power supply circuit of this embodiment includes an electric charge reset circuit that resets a residual charge at the time of a reset.

Referring to FIGS. 4 and 5, the diodes D1 and D2 and fuses F1 and F2 are connected to a power supply terminal 21 on the negative side (−48 V). Alternatively, the diodes and fuses may be connected to a power supply terminal 20 on the ground side or to each of the power supply terminals 20 and 21. It is also possible to connect an FET to the ground-side power supply terminal 20 and diodes and fuses to the negative-side power supply terminal 21 or to connect diodes and fuses to the ground-side power supply terminal 20 and an FET to the negative-side power supply terminal 21.

A surge protection circuit 22 is provided between the diode D1 and the power supply terminal 20. A surge protection circuit 23 is provided between the diode D2 and the power supply terminal 20. Each of the surge protection circuits 22 and 23 protects subsequent circuits from surges using, for example, a varistor that conducts in response to a surge such as lightning or kickback. At a stage subsequent to the surge protection circuit 22, an EMI noise filter 26 is connected to the surge protection circuit 22 through the reset circuit 24. The reset circuit 24 includes an inrush current prevention circuit. At the stage subsequent to the surge protection circuit 23, the power supply monitoring and control circuit 25 is provided.

The power supply monitoring and control circuit 25 monitors the status of a primary voltage using a hot swap IC (Integrated Circuit) 25a, and generates a control signal. When the voltage at the negative-side (−48 V) power supply terminal 21 becomes less than or equal to −38 V because of (power) turn-on, the power supply monitoring and control circuit 25 feeds a control signal whose level gradually becomes HIGH to the gate of each of FETs 24a and 24b of the reset circuit 24 so as to gradually turn ON the FETs 24a and 24b, thereby preventing inrush current. Further, this control signal is fed to the electric charge reset circuit 27 so as to turn OFF a switch SW1. Thereafter, when the voltage at the negative-side (−48 V) power supply terminal becomes greater than −38 V, the power supply monitoring and control circuit 25 switches the level of the control signal to LOW so as to turn OFF the FETs 24a and 24b and turn ON the switch SW1.

The FET 24a serves to prevent inrush current. Further, the operational timing of the FET 24b is the same as that of the FET 24a. The FET 24b, which is provided for safer apparatus design, may be omitted. Like connecting the diode D1 to both the −48V-side power supply terminal 21 and the GND-side power supply terminal 20, providing the FET 24b is more safety-oriented designing.

The EMI noise filter 26 removes electromagnetic noise. The EMI noise filter 26 includes capacitors C1 through C5. An input parasitic inductance oscillation prevention circuit 28 provided at the stage subsequent to the EMI noise filter 26 prevents oscillation due to input parasitic inductance. The input parasitic inductance oscillation prevention circuit 28 includes a series circuit of a capacitor C6 and a resistor R1, and a capacitor C7. The switch SW1 of the electric charge reset circuit 27 is provided in parallel to the capacitor 6. When the switch SW1 turns ON, the electric charges stored in the capacitors C1 through C7 of the EMI noise filter 26 and the input parasitic inductance oscillation prevention circuit 28 are released through the switch SW1 and the resistor R1.

Each of insulating OBPs 30 at the stage subsequent to the input parasitic inductance oscillation prevention circuit 28 converts a primary power supply of −48 V into 3.3 V of a secondary 3.3 V power supply using, for example, a switching regulator. Each of OBP output noise filters 31 removes noise generated in the corresponding insulating OBP 30. Each of secondary residual charge discharge circuits 32 releases a residual charge on the secondary side.

The power supply circuit shown in FIGS. 4 and 5 operates in the following manner. For example, when a package is removed from an apparatus so that an input voltage becomes greater than or equal to a threshold (−38 V), the FETs 24a and 24b of the reset circuit 24 turn OFF, and the switch SW1 of the electric charge reset circuit 27 turns ON, so that the power supply and ground are connected through the resistor R1. This means that the capacitors C1 through C7 provided on the left side (primary side) of the OBPs 30 are discharged at the resistor R1.

Further, when the power supplied from the power supply terminals 20 and 21 varies to be greater than or equal to a stop voltage (−38 V), the power supply monitoring and control circuit 25, which is separated from the reset circuit 24 and the EMI noise filter 26 by the diodes D1 and D2 so as to be provided in parallel thereto, can detect the variation without being affected by the stored charge capacitance of the capacitors C1 through C7 of the EMI noise filter 26 and the input parasitic inductance oscillation prevention circuit 28 and current consumption. When the supplied power becomes greater than or equal to the stop voltage (−38 V), the power supply monitoring and control circuit 25 can reset the power supply circuit by generating a control signal for resetting in a certain period of time to turn OFF the FETs 24a and 24b of the reset circuit 24.

Variation of First Embodiment

Figure 6:
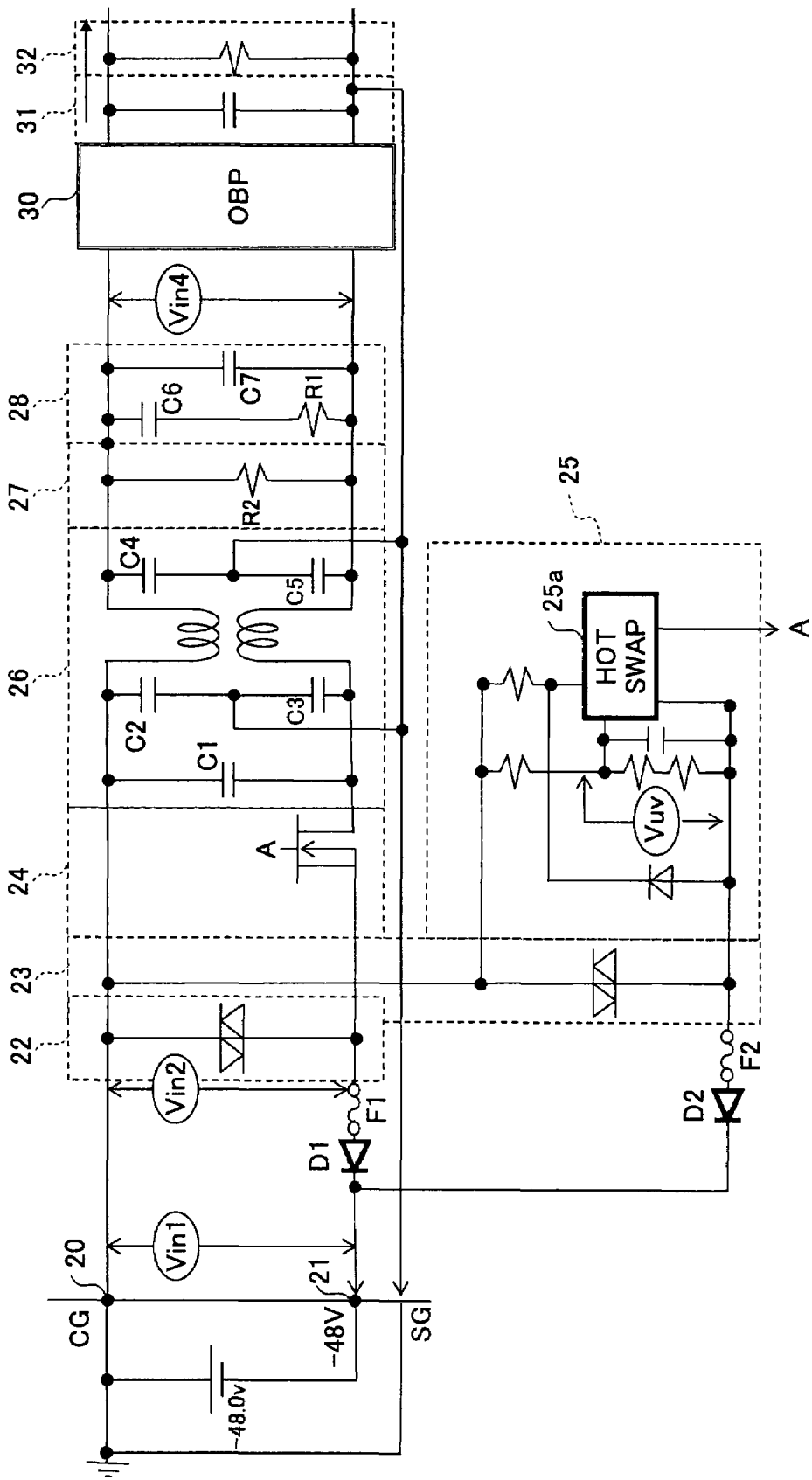
FIG. 6 is a circuit diagram showing a distributed power supply circuit according to a variation of the first embodiment of the present invention.

FIG. 6 is a circuit diagram showing a distributed power supply circuit according to a variation of the first embodiment of the present invention. In the distributed power supply circuit of FIG. 6, the FET 24b shown in FIG. 5 is omitted in the reset circuit 24, and the switch SW1 shown in FIG. 5 is replaced by a resistor R2 for discharging in the electric charge reset circuit 27. The FET 24b can be omitted for the reason set forth above.

The resistor R2, which constantly discharges the capacitors C1 through C7 of the EMI noise filter 26 and the input parasitic inductance oscillation prevention circuit 28, has a greater resistance than the resistor R1.

Thus, according to the first embodiment, it is possible to perform stable power supply monitoring. That is, even when there are package types such as a control system and a main signal system, it is possible to make uniform the reset response time at the time of power supply variation. Further, it is possible to perform stable package insertion and removal.

Second Embodiment

Figure 7:
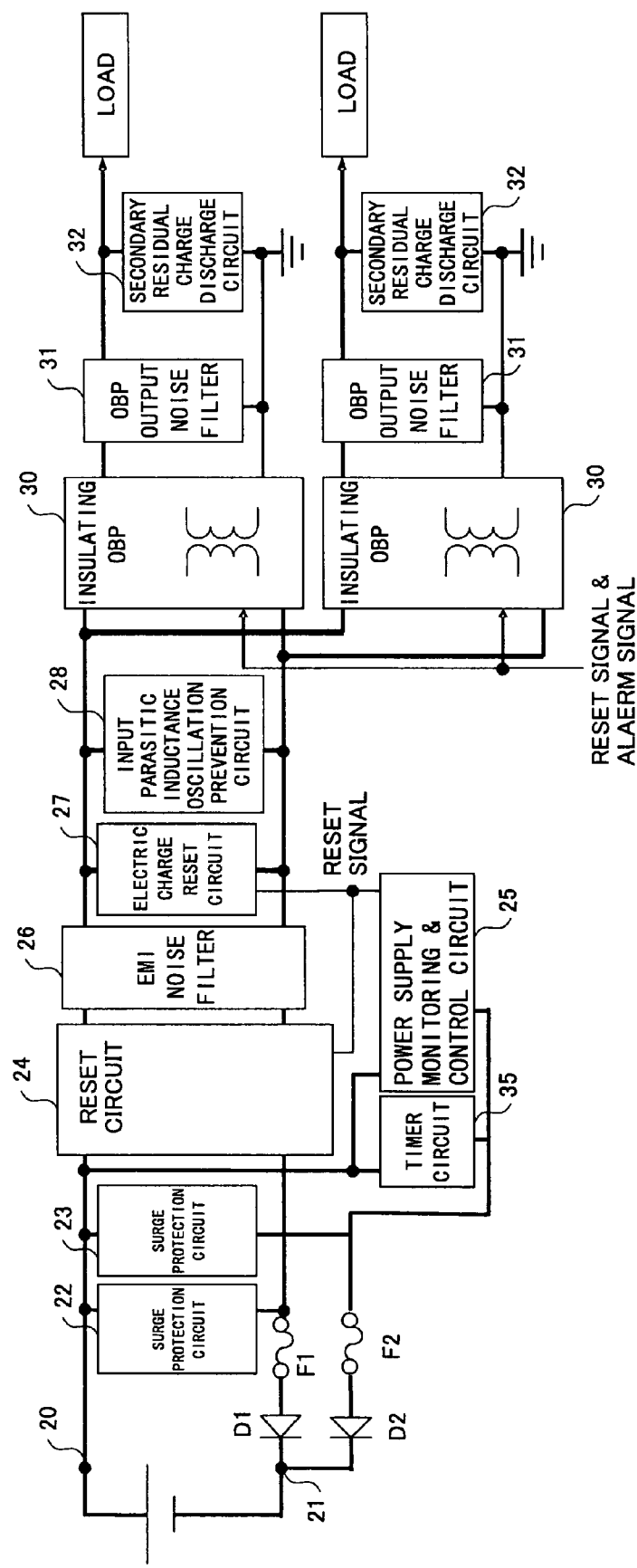
FIG. 7 is a block diagram showing a distributed power supply circuit according to a second embodiment of the present invention.
Figure 8:
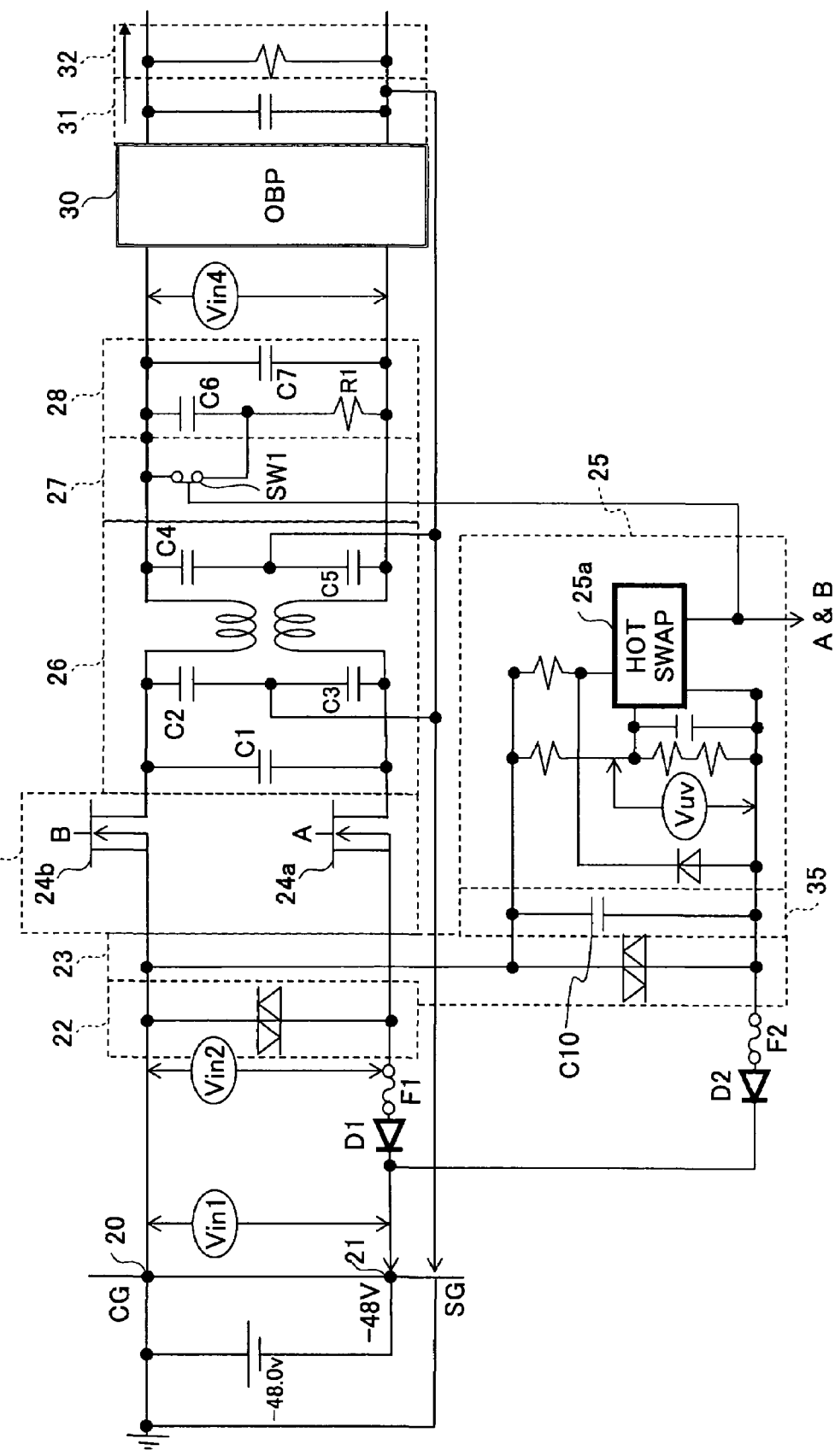
FIG. 8 is a circuit diagram showing the distributed power supply circuit according to the second embodiment of the present invention.

FIGS. 7 and 8 are a block diagram and a circuit diagram, respectively, of a distributed power supply circuit according to a second embodiment of the present invention. In FIGS. 7 and 8, the same elements as those described above are referred to by the same reference numerals. According to the second embodiment, a timer circuit 35 (timer part) is added to the power supply monitoring and control circuit 25 of the first embodiment. The timer part 35 is provided in order to control a time for detecting a monitored voltage in the power supply monitoring and control circuit 25 so as to be able to control a response time with respect to a time of instantaneous variation in supply voltage.

Referring to FIGS. 7 and 8, the diodes D1 and D2 and the fuses F1 and F2 are connected to the power supply terminal 21 on the negative side (−48 V). Alternatively, the diodes and fuses may be connected to the power supply terminal 20 on the ground side or to each of the power supply terminals 20 and 21. It is also possible to connect an FET to the ground-side power supply terminal 20 and diodes and fuses to the negative-side power supply terminal 21 or to connect diodes and fuses to the ground-side power supply terminal 20 and an FET to the negative-side power supply terminal 21.

The surge protection circuit 22 is provided between the diode D1 and the power supply terminal 20. The surge protection circuit 23 is provided between the diode D2 and the power supply terminal 20. Each of the surge protection circuits 22 and 23 protects subsequent circuits from surges using, for example, a varistor that conducts in response to a surge such as lightning or kickback. At a stage subsequent to the surge protection circuit 22, the EMI noise filter 26 is connected to the surge protection circuit 22 through the reset circuit 24. At a stage subsequent to the surge protection circuit 23, the power supply monitoring and control circuit 25 is connected to the surge protection circuit 23 through the timer circuit 35.

The timer circuit 35, which is formed of a capacitor C10, delays a variation in the primary voltage supplied to the power supply monitoring and control part 25, thereby controlling a response time to a desired value.

The power supply monitoring and control circuit 25 monitors the status of the primary voltage using the hot swap IC (Integrated Circuit) 25a, and generates a control signal. When the voltage at the negative-side (−48 V) power supply terminal 21 becomes less than or equal to −38 V because of (power) turn-on, the power supply monitoring and control circuit 25 feeds a control signal whose level gradually becomes HIGH to the gate of each of the FETs 24a and 24b of the reset circuit 24 so as to gradually turn ON the FETs 24a and 24b, thereby preventing inrush current. Further, this control signal is fed to the electric charge reset circuit 27 so as to turn OFF the switch SW1. Thereafter, when the voltage at the negative-side (−48 V) power supply terminal becomes greater than −38 V, the power supply monitoring and control circuit 25 switches the level of the control signal to LOW so as to turn OFF the FETs 24a and 24b and turn ON the switch SW1.

The FET 24a serves to prevent inrush current. Further, the operational timing of the FET 24b is the same as that of the FET 24a. The FET 24b, which is provided for safer apparatus design, may be omitted. Like connecting the diode D1 to both the −48V-side power supply terminal 21 and the GND-side power supply terminal 20, providing the FET 24b is more safety-oriented designing.

The EMI noise filter 26 removes electromagnetic noise. The input parasitic inductance oscillation prevention circuit 28 provided at the stage subsequent to the EMI noise filter 26 prevents oscillation due to input parasitic inductance. The input parasitic inductance oscillation prevention circuit 28 includes the series circuit of the capacitor C6 and the resistor R1. The switch SW1 of the electric charge reset circuit 27 is provided in parallel to the capacitor 6. When the switch SW1 turns ON, the electric charges stored in the capacitors C1 through C7 of the EMI noise filter 26 and the input parasitic inductance oscillation prevention circuit 28 are released through the switch SW1 and the resistor R1.

Each insulating OBP 30 at the stage subsequent to the input parasitic inductance oscillation prevention circuit 28 converts a primary power supply of −48 V into 3.3 V of a secondary 3.3 V power supply using, for example, a switching regulator. Each OBP output noise filter 31 removes noise generated in the corresponding insulating OBP 30. Each Secondary Residual Charge Discharge circuit 32 releases a residual charge on the secondary side.

The power supply circuit shown in FIGS. 7 and 8 operates in the following manner. For example, when a package is removed from an apparatus so that an input voltage becomes greater than or equal to a threshold (−38 V), the FETs 24a and 24b of the reset circuit 24 turn OFF, and the switch SW1 of the electric charge reset circuit 27 turns ON, so that the power supply and ground are connected through the resistor R1. This means that the capacitors C1 through C7 provided on the left side (primary side) of the OBPs 30 are discharged at the resistor R1.

Further, when the power supplied from the power supply terminals 20 and 21 becomes greater than or equal to a stop voltage (−38 V) after varying for a longer period of time than a response time set in the timer circuit 35, the power supply monitoring and control circuit 25, which is provided in parallel to the reset circuit 24 and the EMI noise filter 26, can detect the variation without being affected by the stored charge capacitance of the capacitors C1 through C7 of the EMI noise filter 26 and the input parasitic inductance oscillation prevention circuit 28 and current consumption. When the supplied power becomes greater than or equal to the stop voltage (−38 V), the power supply monitoring and control circuit 25 can reset the power supply circuit by generating a control signal for resetting in a certain period of time to turn OFF the FETs 24a and 24b of the reset circuit 24.

Variation of Second Embodiment

Figure 9:
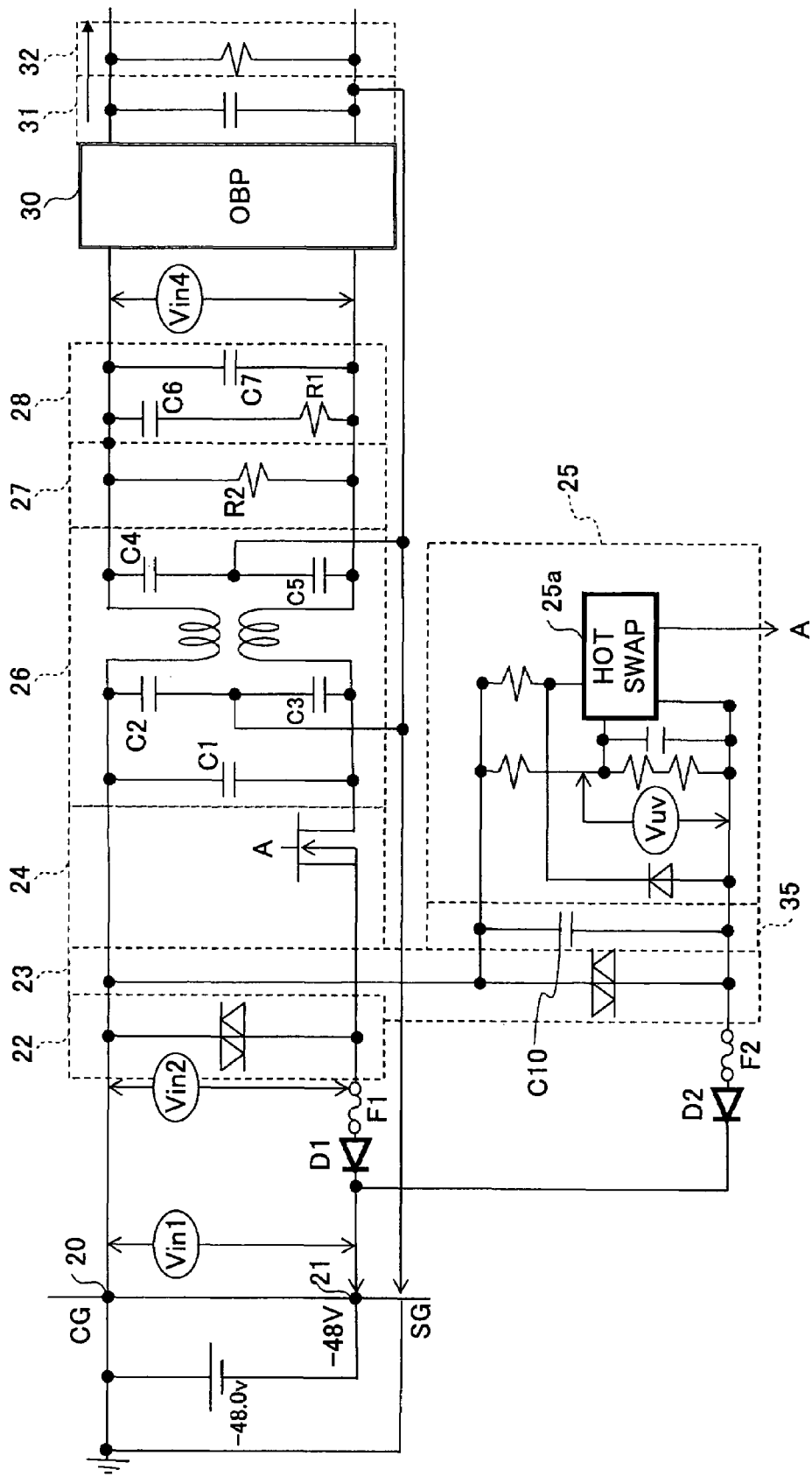
FIG. 9 is a circuit diagram showing a distributed power supply circuit according to a variation of the second embodiment of the present invention.

FIG. 9 is a circuit diagram showing a distributed power supply circuit according to a variation of the second embodiment of the present invention. In the distributed power supply circuit of FIG. 9, the FET 24b shown in FIG. 8 is omitted in the reset circuit 24, and the switch SW1 shown in FIG. 8 is replaced by the resistor R2 for discharging in the electric charge reset circuit 27. The FET 24b can be omitted for the reason set forth above.

The resistor R2, which constantly discharges the capacitors C1 through C7 of the EMI noise filter 26 and the input para-
sitic inductance oscillation prevention circuit 28, has a greater resistance than the resistor R1.

Thus, while the voltage detection time is determined by the characteristics of the power supply monitoring and control part 25 itself in the first embodiment, it is possible to flexibly control the voltage detection time in the timer circuit 35 in the second embodiment. This makes it possible to configure power supply ON/OFF of each package with more flexibility.

This means that it is possible to control the response time to an instantaneous variation in monitored supply voltage package type by package type. This makes it possible to freely set the response time of a package, so that, for example, the response time of a control system package can be longer than the response time of a main signal system package, the response time of a control system package can be shorter than the response time of a main signal system package, or the response time of a control system package can be the same as the response time of a main signal system package.

That is, if the response time of the control system package is set to be equal to the response time of the main signal system package, it is possible to make uniform the reset timings of the packages.

On the other hand, if the response time of the control system package is set to be longer than the response time of the main signal system package, it is possible to ensure, in the control system package, detection of the reset operation of the main signal system package due to a variation in its power supply.

Further, if the response time of the control system package is set to be shorter than the response time of the main signal system package, the main signal system package can adapt to the case of carrying an application that is desired to operate to the end even when there is a variation in apparatus-supplied power.

Third Embodiment

Figure 10:
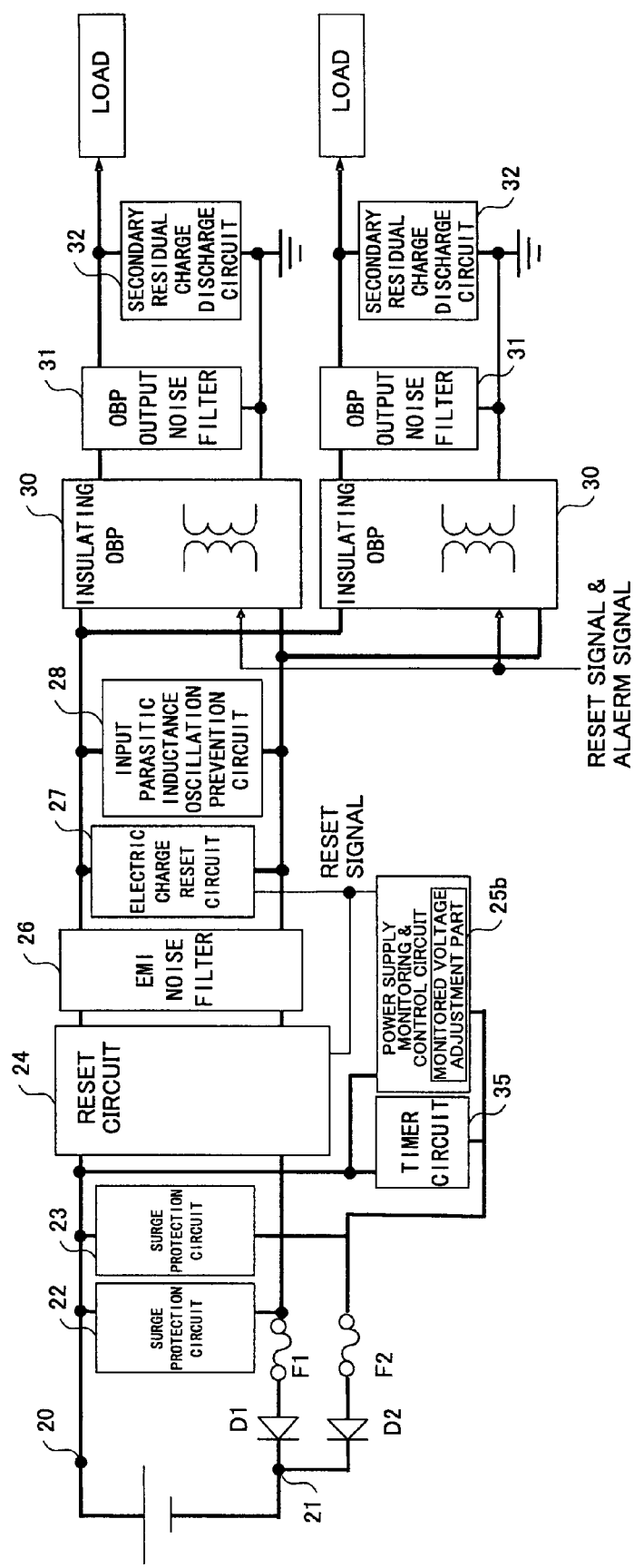
FIG. 10 is a block diagram showing a distributed power supply circuit according to a third embodiment of the present invention.
Figure 11:
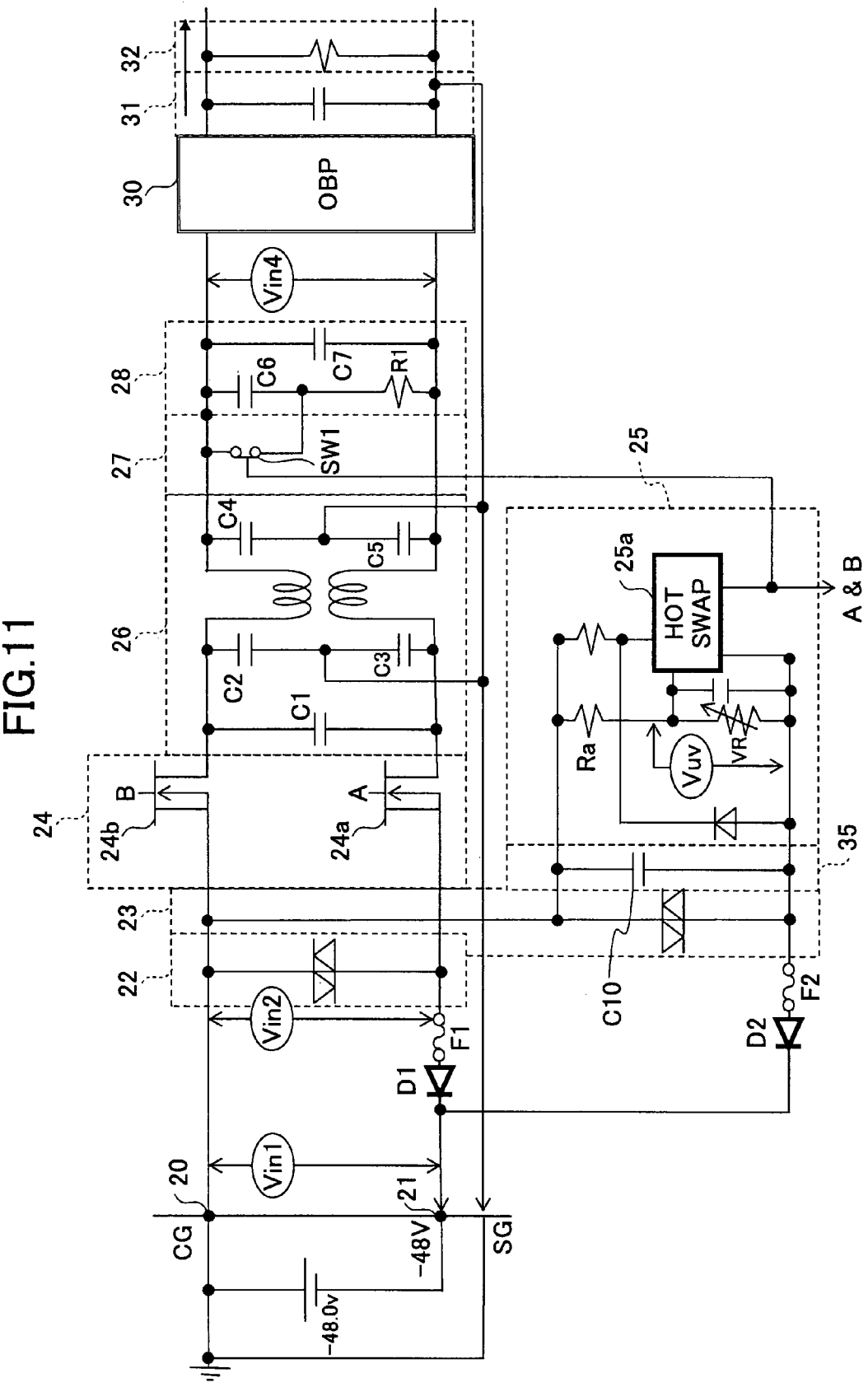
FIG. 11 is a circuit diagram showing the distributed power supply circuit according to the third embodiment of the present invention.

FIGS. 10 and 11 are a block diagram and a circuit diagram, respectively, of a distributed power supply circuit according to a third embodiment of the present invention. In FIGS. 10 and 11, the same elements as those described above are referred to by the same reference numerals. According to the third embodiment, a monitored voltage adjustment part 25b is provided in the power supply monitoring and control circuit 25 of the second embodiment. The monitored voltage adjustment part 25b is provided in order to make it possible to adjust a monitored voltage in the power supply monitoring and control circuit 25.

Referring to FIGS. 10 and 11, the diodes D1 and D2 and the fuses F1 and F2 are connected to the power supply terminal 21 on the negative side (−48 V). Alternatively, the diodes and fuses may be connected to the power supply terminal 20 on the ground side or to each of the power supply terminals 20 and 21. It is also possible to connect an FET to the ground-side power supply terminal 20 and diodes and fuses to the negative-side power supply terminal 21 or to connect diodes and fuses to the ground-side power supply terminal 20 and an FET to the negative-side power supply terminal 21.

The surge protection circuit 22 is provided between the diode D1 and the power supply terminal 20. The surge protection circuit 23 is provided between the diode D2 and the power supply terminal 20. Each of the surge protection circuits 22 and 23 protects subsequent circuits from surges using, for example, a varistor that conducts in response to a surge such as lightning or kickback. At a stage subsequent to the surge protection circuit 22, the EMI noise filter 26 is connected to the surge protection circuit 22 through the reset circuit 24. At a stage subsequent to the surge protection circuit 23, the power supply monitoring and control circuit 25 is connected to the surge protection circuit 23 through the timer circuit 35.

The timer circuit 35, which is formed of a capacitor C10, delays a variation in the primary voltage supplied to the power supply monitoring and control part 25, thereby controlling a response time to a desired value.

The power supply monitoring and control circuit 25 monitors the status of the primary voltage using the hot swap IC (Integrated Circuit) 25a, and generates a control signal. The monitored voltage adjustment part 25b employs a variable resistor VR as one of the voltage dividing resistors that divide the negative-side supply voltage −48 V and supply a resulting divided voltage to the hot swap IC 25a. The other one of the voltage dividing resistors is a resistor Ra.

When the voltage at the negative-side (−48 V) power supply terminal 21 becomes less than or equal to a set voltage (a value adjusted in the monitored voltage adjustment part 25b) because of (power) turn-on, the power supply monitoring and control circuit 25 feeds a control signal whose level gradually becomes HIGH to the gate of each of the FETs 24a and 24b of the reset circuit 24 so as to gradually turns ON the FETs 24a and 24b, thereby preventing inrush current. Further, this control signal is fed to the electric charge reset circuit 27 so as to turn OFF the switch SW1. Thereafter, when the voltage at the negative-side (−48 V) power supply terminal becomes greater than the set voltage (a value adjusted in the monitored voltage adjustment part 25b), the power supply monitoring and control circuit 25 switches the level of the control signal to LOW so as to turn OFF the FETs 24a and 24b and turn ON the switch SW1.

The FET 24a serves to prevent inrush current. Further, the operational timing of the FET 24b is the same as that of the FET 24a. The FET 24b, which is provided for safer apparatus design, may be omitted. Like connecting the diode D1 to both the −48V-side power supply terminal 21 and the GND-side power supply terminal 20, providing the FET 24b is more safety-oriented designing.

The EMI noise filter 26 removes electromagnetic noise. The input parasitic inductance oscillation prevention circuit 28 provided at the stage subsequent to the EMI noise filter 26 prevents oscillation due to input parasitic inductance. The input parasitic inductance oscillation prevention circuit 28 includes the series circuit of the capacitor C6 and the resistor R1. The switch SW1 of the electric charge reset circuit 27 is provided in parallel to the capacitor 6. When the switch SW1 turns ON, the electric charges stored in the capacitors C1 through C7 of the EMI noise filter 26 and the input parasitic inductance oscillation prevention circuit 28 are released through the switch SW1 and the resistor R1.

Each insulating OBP 30 at the stage subsequent to the input parasitic inductance oscillation prevention circuit 28 converts a primary power supply of −48 V into 3.3 V of a secondary 3.3 V power supply using, for example, a switching regulator. Each OBP output noise filter 31 removes noise generated in the corresponding insulating OBP 30. Each Secondary Residual Charge Discharge circuit 32 releases a residual charge on the secondary side.

The power supply circuit shown in FIGS. 10 and 11 operates in the following manner. For example, when a package is removed from an apparatus so that an input voltage becomes greater than or equal to a set voltage (a value adjusted in the monitored voltage adjustment part 25b), the FETs 24a and 24b of the reset circuit 24 turn OFF, and the switch SW1 of the electric charge reset circuit 27 turns ON, so that the power supply and ground are connected through the resistor R1. This means that the capacitors C1 through C7 provided on the left side (primary side) of the OBPs 30 are discharged at the resistor R1.

Further, when the power supplied from the power supply terminals 20 and 21 becomes greater than or equal to the set voltage (a value adjusted in the monitored voltage adjustment part 25b) after varying for a longer period of time than a response time set in the timer circuit 35, the power supply monitoring and control circuit 25, which is provided in parallel to the reset circuit 24 and the EMI noise filter 26, can detect the variation without being affected by the stored charge capacitance of the capacitors C1 through C7 of the EMI noise filter 26 and the input parasitic inductance oscillation prevention circuit 28 and current consumption. When the supplied power becomes greater than or equal to the set voltage (a value adjusted in the monitored voltage adjustment part 25b), the power supply monitoring and control circuit 25 can reset the power supply circuit by generating a control signal for resetting in a certain period of time to turn OFF the FETs 24a and 24b of the reset circuit 24.

Variation of Third Embodiment

Figure 12:
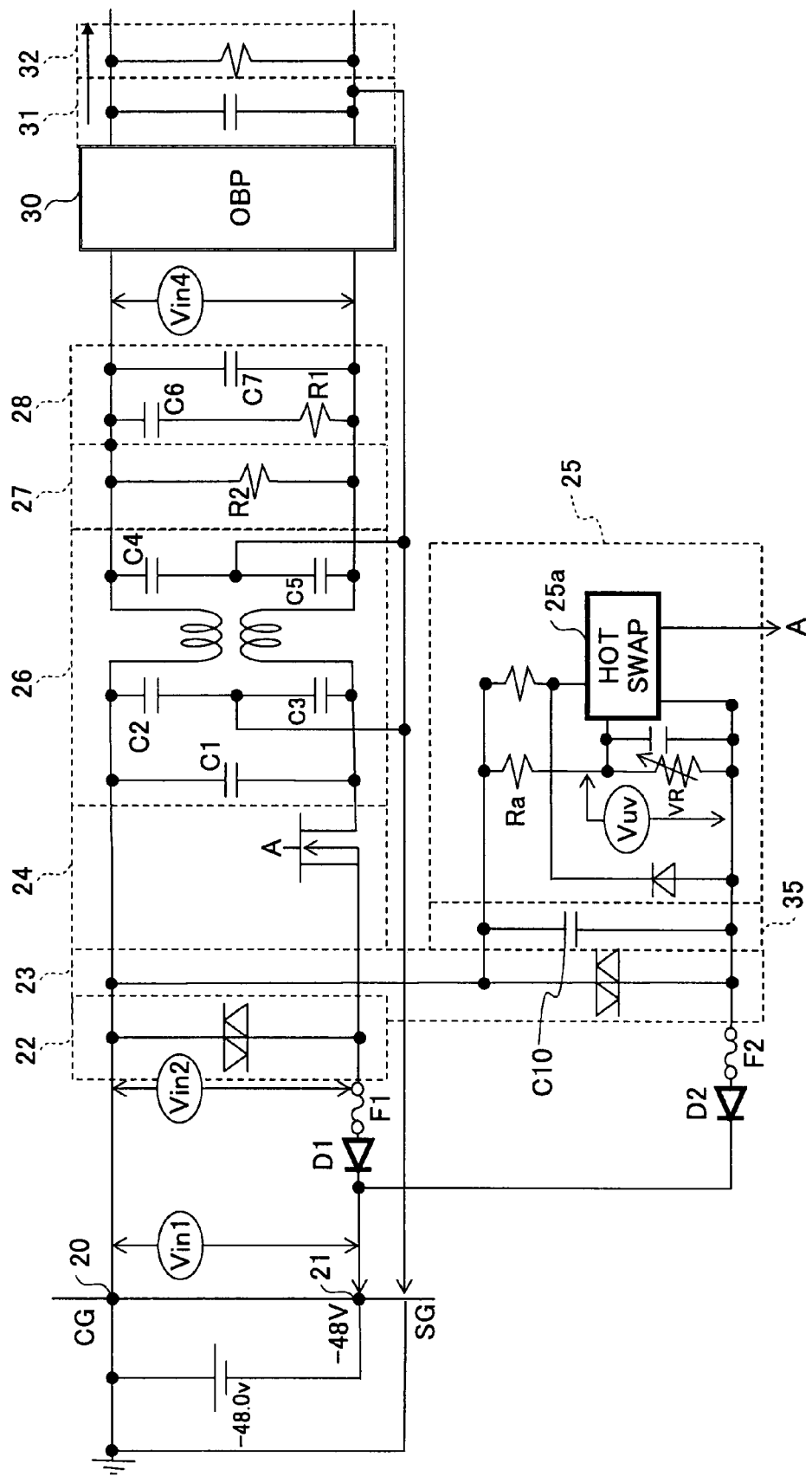
FIG. 12 is a circuit diagram showing a distributed power supply circuit according to a variation of the third embodiment of the present invention.

FIG. 12 is a circuit diagram showing a distributed power supply circuit according to a variation of the third embodiment of the present invention. In the distributed power supply circuit of FIG. 12, the FET 24b shown in FIG. 11 is omitted in the reset circuit 24, and the switch SW1 shown in FIG. 11 is replaced by the resistor R2 for discharging in the electric charge reset circuit 27. The FET 24b can be omitted for the reason set forth above.

The resistor R2, which constantly discharges the capacitors C1 through C7 of the EMI noise filter 26 and the input parasitic inductance oscillation prevention circuit 28, has a greater resistance than the resistor R1.

Thus, according to the third embodiment, it is possible to flexibly determine a monitored voltage package by package with the monitored voltage adjustment part 25b. This makes it possible to configure power supply ON/OFF of each package with more flexibility. This means that it is possible to control a monitored voltage package type by package type. This makes it possible to freely set the monitored voltage of a package, so that, for example, the monitored voltage of a control system package can be higher than the monitored voltage of a main signal system package, the monitored voltage of a control system package can be lower than the monitored voltage of a main signal system package, or the monitored voltage of a control system package can be the same as the monitored voltage of a main signal system package. Further, it is possible to perform an operation with more flexibility in combination with the function of the timer part 35 (the response time of a monitored voltage) of the second embodiment.

That is, by equalizing the product of the response time and monitored voltage of a control system package with the product of the response time and monitored voltage of a main signal system package, it is possible to make uniform the reset timings of the packages in an apparatus.

Alternatively, by making the product of the response time and monitored voltage of a control system package greater than the product of the response time and monitored voltage of a main signal system package, it is possible to ensure, in the control system package, detection of the reset operation of the main signal system package due to a variation in its power supply.

Further, by making the product of the response time and monitored voltage of a control system package less than the product of the response time and monitored voltage of a main signal system package, the main signal system package can adapt to the case of carrying an application that is desired to operate to the end even when there is a variation in apparatus-supplied power.

[Remote Control]

Figure 13:
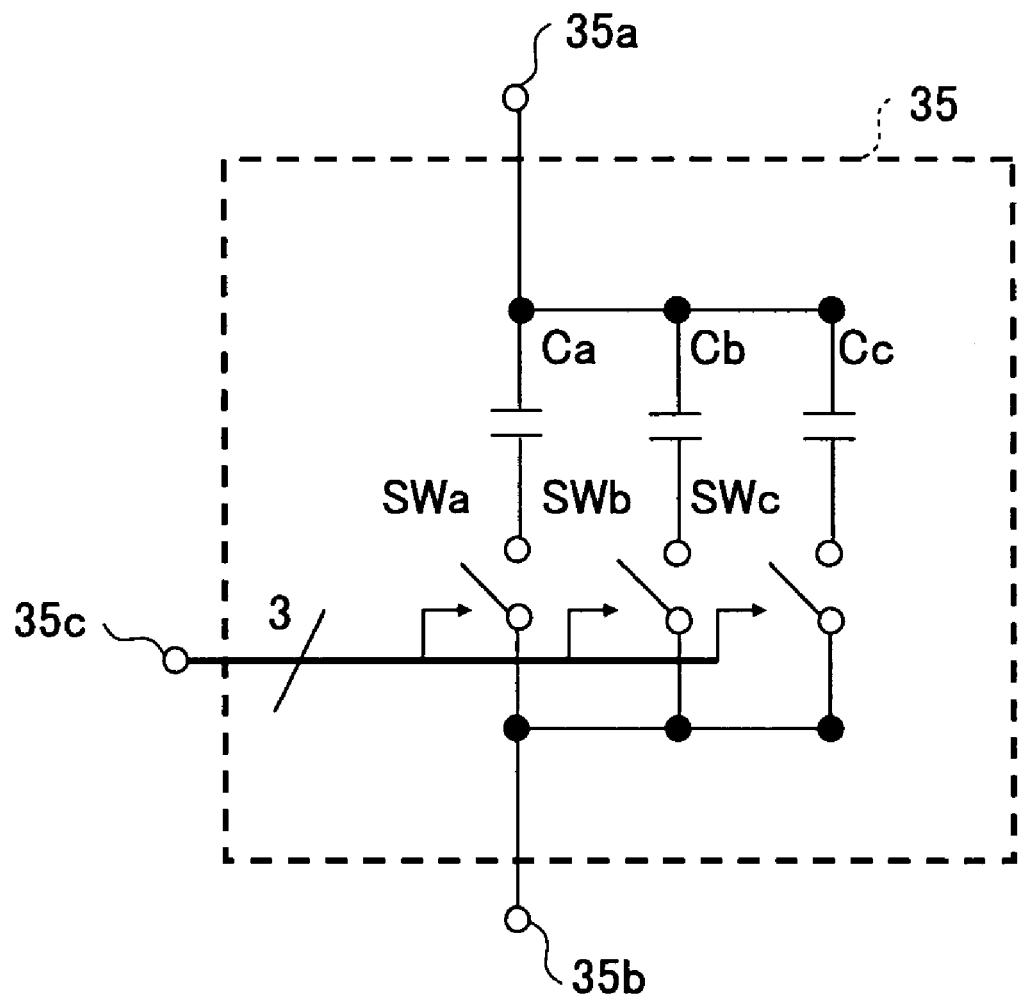
FIG. 13 is a diagram showing a configuration of a timer circuit for remote control according to the third embodiment of the present invention.

FIG. 13 is a diagram showing a configuration of the timer circuit 35 for remote control according to the third embodiment of the present invention. A terminal 35a is connected to the power supply terminal 20, and a terminal 35b is connected to the diode D1. Referring to FIG. 13, a series circuit of a capacitor Ca and a switch SWa, a series circuit of a capacitor Cb and a switch SWb, and a series circuit of a capacitor Cc and a switch SWc are connected in parallel with one another between the terminals 35a and 35b.

A 3-bit switching control signal is fed to a terminal 35c so as to turn ON at least one of the switches SWa, SWb, and SWc. By changing the capacitance of the timer circuit 35 with the switching control signal, it is possible to variably control the detection time of a monitored voltage by remote control.

Figure 14:
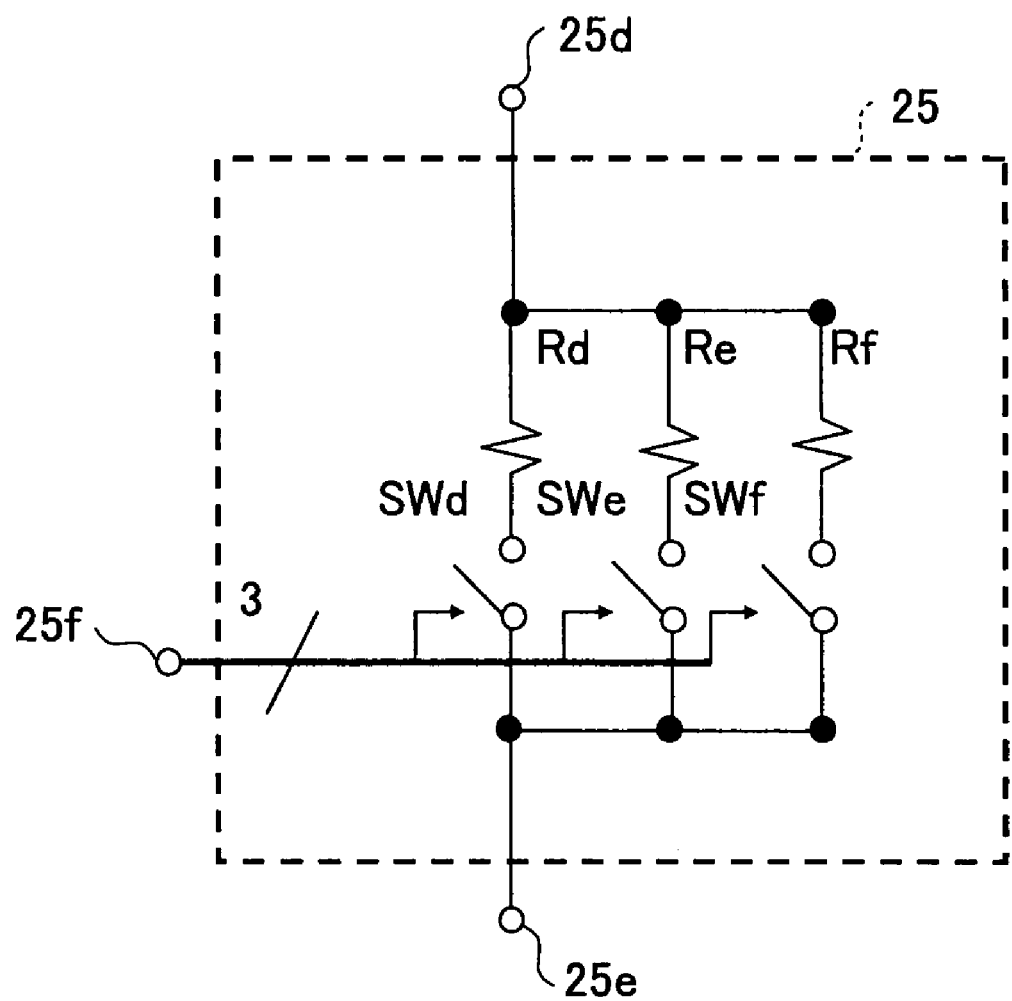
FIG. 14 is a diagram showing a configuration of a monitored voltage adjustment part for remote control according to the third embodiment of the present invention.

FIG. 14 is a diagram showing a configuration of the monitored voltage adjustment part 25b for remote control according to the third embodiment of the present invention. A terminal 25d is connected to the voltage dividing resistor Ra, and a terminal 25e is connected to the diode D1. Referring to FIG. 14, a series circuit of a resistor Rd and a switch SWd, a series circuit of a resistor Re and a switch SWe, and a series circuit of a resistor Rf and a switch SWf are connected in parallel with one another between the terminals 25d and 25e.

A 3-bit switching control signal is fed to a terminal 25c so as to turn ON at least one of the switches SWd, SWe, and SWf. By changing the ratio of voltage division with the switching control signal, it is possible to variably control a set voltage by remote control.

Figure 15:
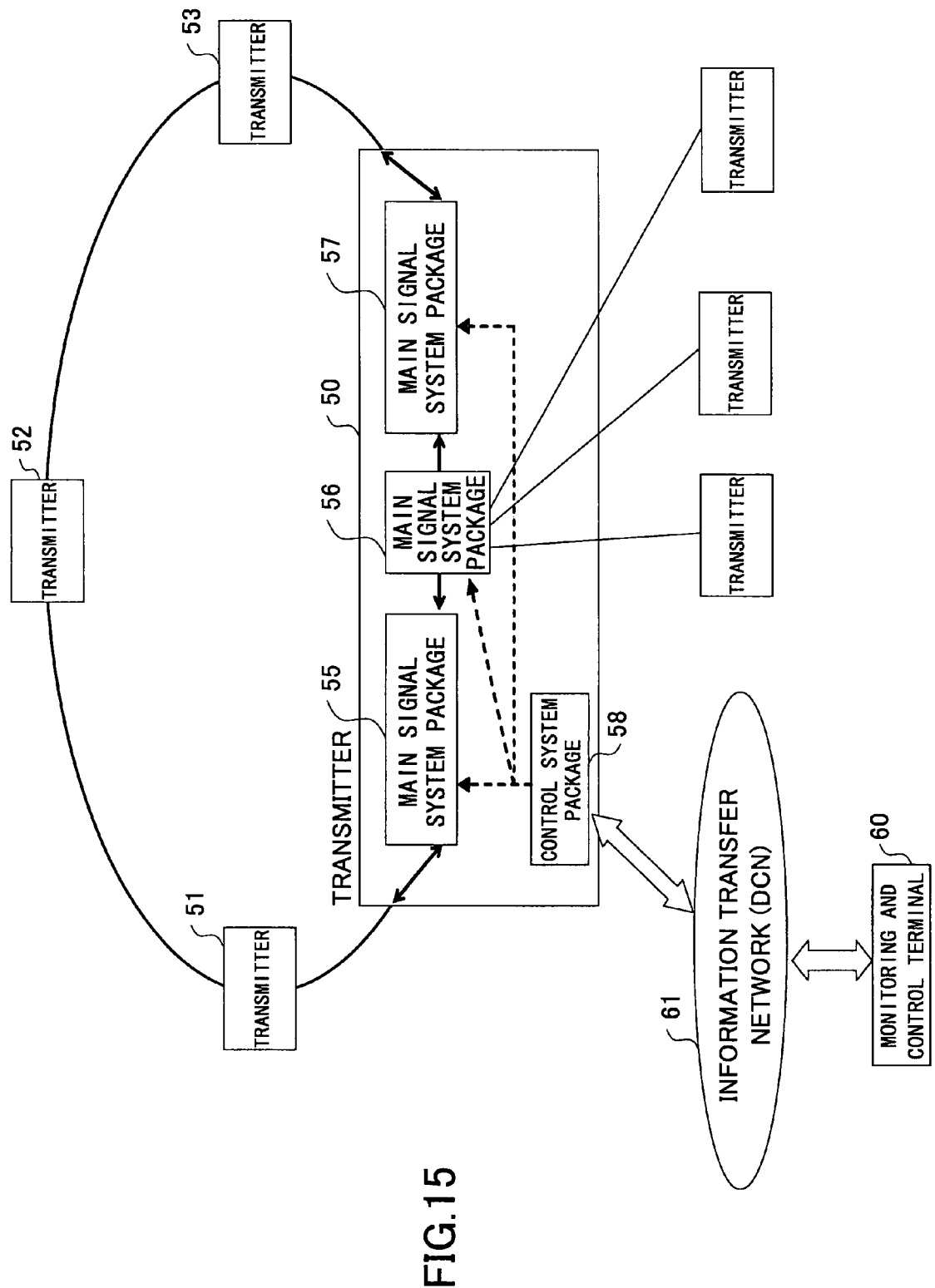
FIG. 15 is a diagram showing a network to which the present invention is applied according to the third embodiment of the present invention.

FIG. 15 is a diagram showing a network to which the present invention is applied according to the third embodiment of the present invention.

In the network configuration shown in FIG. 15, transmitters 50 through 53 configure a ring network. Each of the transmitters 50 through 53 includes two types of packages. For example, the transmitter 50 includes main signal system packages 55, 56, and 57 and a control system package 58.

The main signal system packages 55, 56, and 57 process a main signal to be transmitted, and the control system package 58 sets up each of the main signal system packages 55, 56, and 57 and performs alarm processing. The control system package 58, which is connected to a remote terminal 60 for monitoring and control through an information transfer network (DCN: Digital Communication Network) 61 such as a private line or the Internet, has the function of setting up an apparatus from a remote place and monitoring an apparatus alarm. The switching control signals described with reference to FIGS. 13 and 14 are transmitted to the transmitter 50 through the path of this information transfer network 61 so as to perform remote control on a monitoring time and a monitored voltage.

As described above, a power supply circuit according to one aspect of the present invention is useful for an apparatus operation at the time of voltage variation and for a stable apparatus operation at the time of inserting or removing a package in the place of use by a user, and is suitable for an apparatus having a complicated configuration with multiple packages using distributed power supply.

The insulating OBPs 30 may correspond to a voltage conversion part, the power supply monitoring and control circuit 25 may correspond to a power supply monitoring part, the reset circuit 24 may correspond to a reset part, the electric charge reset circuit 27 may correspond to a discharge part, the timer circuit 35 may correspond to a timer part, and the monitored voltage adjustment part 25b may corresponding to a voltage setting part.

According to one embodiment of the present invention, there is provided a distributed power supply circuit supplying common power to multiple packages in an apparatus so that a primary voltage of the common power is converted into a secondary voltage in a voltage conversion part so as to be supplied to a circuit in each of the packages, the distributed power supply circuit including a power supply monitoring part configured to monitor the primary voltage; a reset part configured to stop the supply of the primary voltage to the voltage conversion part when the power supply monitoring part detects the abnormality of the primary voltage; and a discharge part configured to release a stored charge on the primary side of the voltage conversion part when the power supply monitoring part detects the abnormality of the primary voltage, wherein the power supply monitoring part is separated from the reset part by multiple diodes so as to be provided in parallel with the reset part.

According to the above-described distributed power supply circuit, it is possible to control a response time for detecting a variation in the primary voltage to a desired value, and it is possible to prevent noise generation at the time of package attachment.

The present invention is not limited to the specifically disclosed embodiments, and variations and modifications may be made without departing from the scope of the present invention.

The present application is based on Japanese Priority Patent Application No. 2006-248640, filed on Sep. 13, 2006, the entire contents of which are hereby incorporated by reference.

What is claimed is:

1. A distributed power supply circuit supplying common power to a plurality of packages in an apparatus so that a primary voltage of the common power is converted into a secondary voltage in a voltage conversion part so as to be supplied to a circuit in each of the packages, the distributed power supply circuit comprising:

a power supply monitoring part configured to monitor the primary voltage;

a reset part configured to stop the supply of the primary voltage to the voltage conversion part when the power supply monitoring part detects an abnormality of the primary voltage; and a discharge part configured to release a stored charge on a primary side of the voltage conversion part when the power supply monitoring part detects the abnormality of the primary voltage, wherein the power supply monitoring part is separated from the reset part by a plurality of diodes so as to be provided in parallel with the reset part.

2. The distributed power supply circuit as claimed in claim 1, wherein the discharge part comprises a switch that turns on upon the detection of the abnormality of the primary voltage.

3. The distributed power supply circuit as claimed in claim 1, wherein the discharge part comprises a resistor that constantly releases the stored charge on the primary side.

4. The distributed power supply circuit as claimed in claim 1, further comprising:

a timer part configured to variably set a monitoring time for the power supply monitoring part detecting the abnormality of the primary voltage.

5. The distributed power supply circuit as claimed in claim 4, further comprising:

a remote control part configured to variably set the monitoring time of the timer part.

6. The distributed power supply circuit as claimed in claim 1, further comprising:

a voltage setting part configured to variably set a voltage for the power supply monitoring part detecting the abnormality of the primary voltage.

7. The distributed power supply circuit as claimed in claim 6, further comprising:

a remote control part configured to variably set the voltage for the power supply monitoring part detecting the abnormality of the primary voltage.

* * * * *